United States Patent
Kennedy

(10) Patent No.: US 10,385,722 B2
(45) Date of Patent: Aug. 20, 2019

(54) ADJUSTMENT RING DAMPER

(71) Applicant: BorgWarner Inc., Auburn Hills, MI (US)

(72) Inventor: Donald Michael Kennedy, Asheville, NC (US)

(73) Assignee: BorgWarner Inc., Auburn Hills, MI (US)

(*) Notice: Subject to any disclaimer, the term of this patent is extended or adjusted under 35 U.S.C. 154(b) by 319 days.

(21) Appl. No.: 15/103,047

(22) PCT Filed: Dec. 12, 2014

(86) PCT No.: PCT/US2014/069896
§ 371 (c)(1),
(2) Date: Jun. 9, 2016

(87) PCT Pub. No.: WO2015/089350
PCT Pub. Date: Jun. 18, 2015

(65) Prior Publication Data
US 2016/0305274 A1    Oct. 20, 2016

Related U.S. Application Data

(60) Provisional application No. 61/915,850, filed on Dec. 13, 2013.

(51) Int. Cl.
*F01D 17/16* (2006.01)
*F02B 37/24* (2006.01)
*F01D 9/04* (2006.01)

(52) U.S. Cl.
CPC .......... *F01D 17/165* (2013.01); *F01D 9/041* (2013.01); *F02B 37/24* (2013.01); *F05D 2220/40* (2013.01); *F05D 2240/24* (2013.01); *F05D 2260/30* (2013.01); *F05D 2260/52* (2013.01); *Y02T 10/144* (2013.01)

(58) Field of Classification Search
CPC .......... F01D 17/165; F02C 6/12; F02B 37/24
See application file for complete search history.

(56) References Cited

U.S. PATENT DOCUMENTS

| 4,679,984 A * | 7/1987 | Swihart ................. F01D 17/165 |
| | | 415/163 |
| 7,396,204 B2 * | 7/2008 | Shiraishi ............... F01D 17/165 |
| | | 29/889.2 |

(Continued)

FOREIGN PATENT DOCUMENTS

JP    2000199433 A    7/2000

OTHER PUBLICATIONS

International Search Report and Written Opinion; dated Apr. 9, 2015; for International Application No. PCT/US2014/069896; 8 pages.

*Primary Examiner* — Justin D Seabe
(74) *Attorney, Agent, or Firm* — BrooksGroup

(57) ABSTRACT

A variable turbine geometry turbocharger (100) with an adjustment ring assembly (45) having an adjustment ring (50) and a series of pivotable guide vanes (30) that are operably connected to the adjustment ring (50). A spring-biased retention clip (60) is between adjacent vane levers (36) and is attached to the adjustment ring (50). The retention clip (60) applies a force against the adjacent vane levers (36) and dampens and reduces movement of corresponding components.

7 Claims, 4 Drawing Sheets

(56) References Cited

U.S. PATENT DOCUMENTS

| | | |
|---|---|---|
| 8,573,930 B2 | 11/2013 | Woo et al. |
| 2006/0112690 A1 | 6/2006 | Hemer |
| 2009/0092483 A1* | 4/2009 | Yasui .................... F01D 17/165 |
| | | 415/159 |
| 2012/0243973 A1* | 9/2012 | Kierat ................... F01D 17/165 |
| | | 415/148 |
| 2012/0315164 A1 | 12/2012 | Mayernick et al. |

* cited by examiner

ADJUSTMENT RING DAMPER

CROSS-REFERENCE TO RELATED APPLICATION

This application claims priority to and all the benefits of U.S. Provisional Application No. 61/915,850, filed on Dec. 13, 2013, and entitled "Adjustment Ring Damper," which is incorporated herein by reference.

BACKGROUND

Field of the Disclosure

This disclosure relates to turbochargers with Variable Turbine Geometry (VTG) in combination with a wastegate assembly. More particularly, this disclosure relates to actuating VTG guide vanes as well as a wastegate valve for controlling exhaust gas flow to a turbine wheel, such as with a common actuator.

Description of Related Art

Advantages of turbocharging include increased power output, lower fuel consumption, reduced pollutant emissions, and improved transient response. The turbocharging of engines is no longer primarily seen from a high-power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor wheel that is mounted on the same shaft so that rotation of the turbine wheel causes rotation of the compressor wheel.

Turbochargers typically include a turbine housing connected to the engine's exhaust manifold, a compressor housing connected to the engine's intake manifold, and a center bearing housing coupling the turbine and compressor housings together. The turbine housing defines a volute that surrounds the turbine wheel and that receives exhaust gas from the engine. The turbine wheel in the turbine housing is rotatably driven by a controlled inflow of exhaust gas supplied from the exhaust manifold.

SUMMARY

Several variations of devices and assemblies can be used to control the operation of the turbine stage, including wastegate assemblies and Variable Turbine Geometry (VTG) assemblies used in relationship with exhaust gas flow to the turbine wheel of turbochargers. This disclosure also relates to the VTG aspect of the turbine stage of turbochargers, with an example shown in U.S. Pat. No. 7,886,536, which is incorporated herein by reference.

VTG turbochargers allow a turbine flow cross-section leading to the turbine wheel to be varied in accordance with engine operating points. This allows the entire exhaust gas energy to be utilized and the turbine flow cross-section to be set optimally for each operating point. As a result, the efficiency of the turbocharger and hence that of the engine can be higher than that achieved with only bypass control of a wastegate assembly. Variable guide vanes in the turbine have an effect on pressure build-up behavior and, therefore, on the turbocharger power output.

A VTG turbocharger may include a VTG assembly having a vane ring assembly including a lower vane ring, an upper vane ring (which may include a unison ring), a series of guide vanes pivotally mounted at least partially between the lower vane ring and upper vane ring, and a plurality of spacers positioned between the lower vane ring and upper vane ring.

VTG turbochargers can utilize adjustable guide vanes that are pivotally connected to a lower ring and an upper vane ring, including various possible rings, and/or nozzle wall. These guide vanes are adjusted to control exhaust gas backpressure and turbocharger speed by modulating the exhaust gas flow to the turbine wheel. The guide vanes can be pivoted by vane levers, which can be located above the upper vane ring. Performance and flow to the turbine are influenced by changes of the flow angle to the turbine wheel by pivoting the guide vanes.

One goal of VTG turbochargers is to expand the usable flow rate range in practical applications while maintaining a high level of efficiency. To accomplish this, the turbine output is regulated by changing an inflow angle and inflow speed of the exhaust gas flow at a turbine wheel inlet. With VTG turbochargers, this is achieved using guide vanes in front of the turbine wheel that change their angle of attack with exhaust gas flow speed. This reduces lag at slow speeds while opening to prevent exhaust gas backpressure at higher speeds.

With VTG, turbocharger ratios can be altered as conditions change. When the guide vanes are in a closed position, the high circumferential components of the flow speed and a steep enthalpy gradient lead to a high turbine output and therefore to a high charging pressure. When the guide vanes are in a fully open position, the turbine reaches its maximum flow rate and the velocity vector of the flow has a large centripetal component. One aspect of this type of output control over bypass control is that the entire exhaust gas flow is always directed through the turbine and can be converted to output. Adjustments of the guide vanes can be controlled by various pneumatic or electrical regulators.

An adjustment ring assembly can control the angle of the guide vanes by locating a series of small blocks that engage vane levers secured to the guide vanes. The ring assembly can contain a large block that engages a slot on the actuation pivot shaft. An actuation pivot shaft with the vane levers help control the movement of the guide vanes. The actuation pivot shaft is typically not fitted directly to a bore in the turbine housing, but more often to a stationary bearing in a bore in the turbine housing. The actuation pivot shaft is radially located in the bearing, which can be located either in a bore, with a centerline within the turbine housing, or directly in the bearing housing depending on the design.

The adjustment ring can be positioned radially by arc-shaped ramparts of the vane levers. The adjustment ring is positioned axially between the vane levers and a series of cap-screws that are threaded into the bearing housing. Generous axial and radial clearances are required for thermal expansion and to allow for tolerance stackup.

In some applications, a turbocharger is subjected to vibrational loading that may accelerate the wear of the adjustment ring surface where it contacts the vane lever ramparts. The clearances allow relative motion between the ring and the surrounding components, which may accelerate wear of the components.

This disclosure relates to Variable Turbine Geometry (VTG) turbochargers having an adjustment ring and vane lever ramparts and also having retention clips supported on the adjustment ring and configured to provide damping and reduce relative motion between these components without imposing excessive friction.

Further, the retention clips are spring loaded and can be attached to the adjustment ring and apply a force against the vane levers to which the retention clip is pivotably attached.

Relative motion between components is reduced by locating the pivot point of the retention clip near the instant center between two points on adjacent vane levers. The result is a small amount of rotational and translational movement between the retention clips and the vane levers.

Further advantageously, the retention clips serve to help retain the adjustment ring in its desired axial and radial orientation, reducing tilting and binding of the adjustment ring during operation.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Figure 1:
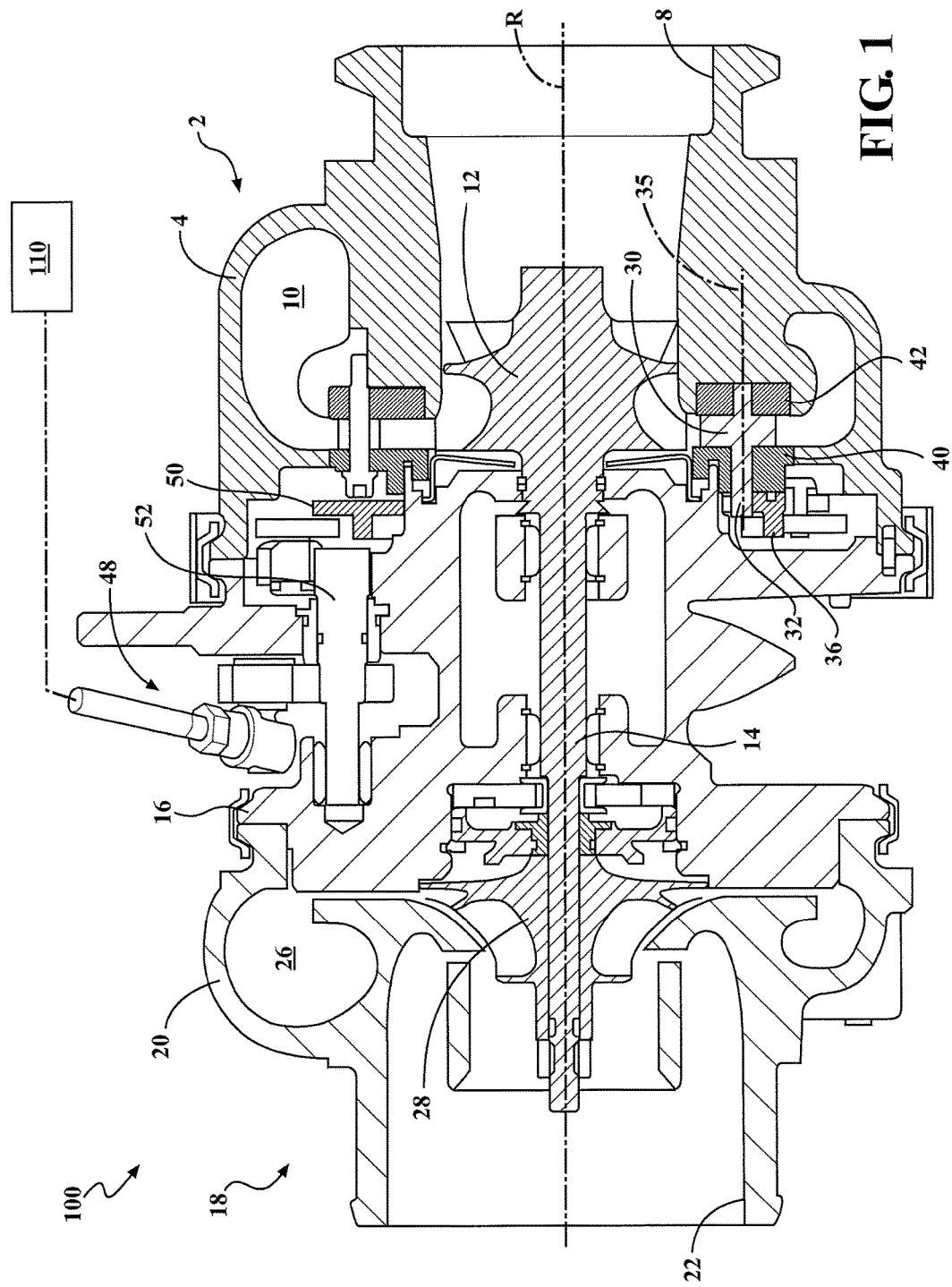
FIG. 1 is a side cross-sectional view of an exhaust gas VTG turbocharger.

Referring to FIG. 1, an exhaust gas turbocharger 100 includes a turbine section 2, the compressor section 18, and a center bearing housing 16 disposed between and connecting the compressor section 18 to the turbine section 2. The turbine section 2 includes a turbine housing 4 that defines an exhaust gas inlet (not shown), an exhaust gas outlet 8, and a turbine volute 10 disposed in the fluid path between the exhaust gas inlet and the exhaust gas outlet 8. A turbine wheel 12 is disposed in the turbine housing 4 between the turbine volute 10 and the exhaust gas outlet 8. A shaft 14 is connected to the turbine wheel 12, is supported for rotation about a rotational axis R within in the bearing housing 16, and extends into the compressor section 18. The compressor section 18 includes a compressor housing 20 that defines an axially-extending air inlet 22, an air outlet (not shown), and a compressor volute 26. A compressor wheel 28 is disposed in the compressor housing 20 between the air inlet 22 and the compressor volute 26, and is connected to the shaft 14.

In use, the turbine wheel 12 in the turbine housing 4 is rotatably driven by an inflow of exhaust gas supplied from the exhaust manifold of an engine (not shown). Since the shaft 14 connects the turbine wheel 12 to the compressor wheel 28 in the compressor housing 20, the rotation of the turbine wheel 12 causes rotation of the compressor wheel 28. As the compressor wheel 28 rotates, it increases the air mass flow rate, airflow density and air pressure delivered to the engine's cylinders via an outflow from the compressor air outlet, which is connected to the engine's air intake manifold.

The turbocharger 100 is a variable turbine geometry turbocharger (VTG). In particular, the turbine section 2 includes a plurality of pivotable vanes 30 to control the flow of exhaust gas that impinges on the turbine wheel 12 and control the power of the turbine section 2. The vanes 30 also therefore control the pressure ratio generated by the compressor section 18. In engines that control the production of NOx by the use of High Pressure Exhaust Gas Recirculation (HP EGR) techniques, the vanes 30 also provide a means for controlling and generating exhaust back pressure.

Figures 2, 3:
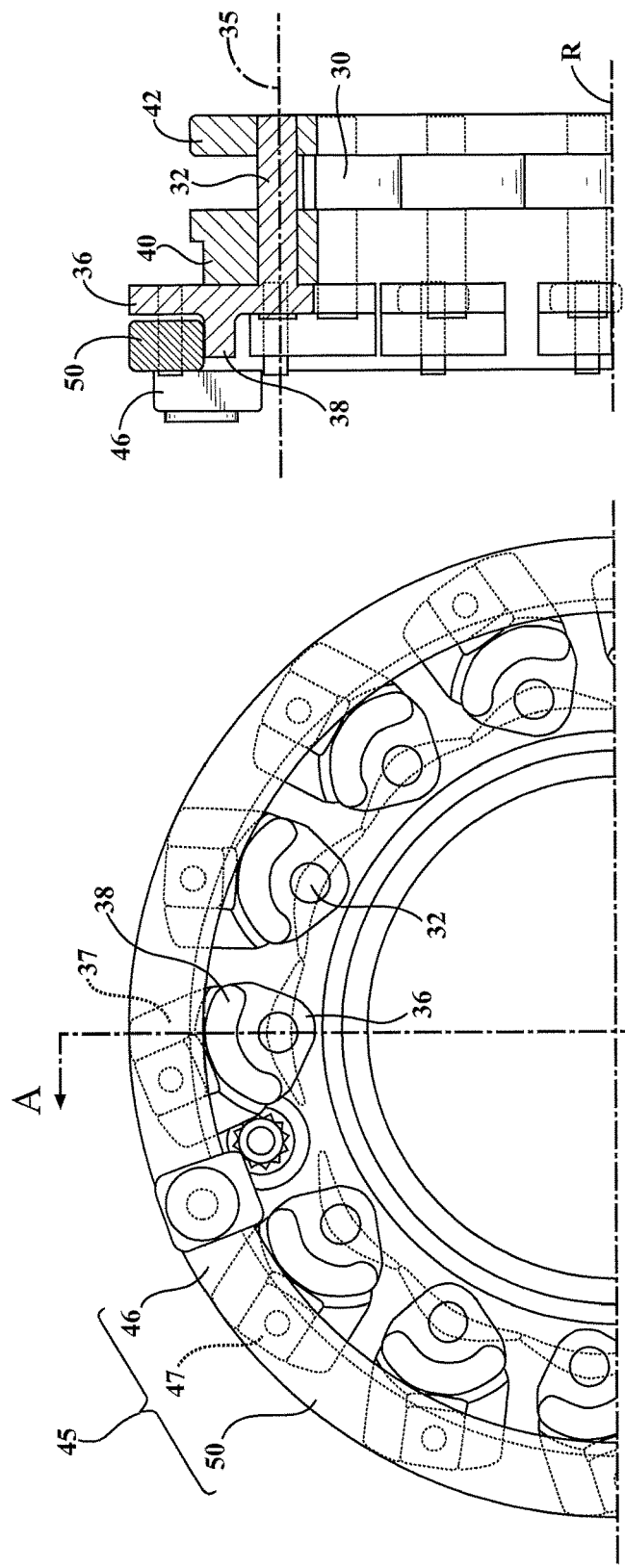
FIG. 2 is a side view of an adjustment ring assembly of the turbocharger of claim 1.
FIG. 3 is a cross-sectional view of the adjustment ring assembly as seen along line AA of FIG. 2.

Referring also to FIGS. 2-3, the vanes 30 are arranged in a circular array around the turbine wheel 12, and are located between the turbine volute 10 and the turbine wheel 12. The vanes 30 are pivotably supported in this configuration between a generally annular upper vane ring 40 and a generally annular lower vane ring 42, where "upper" refers to being closer to the center bearing housing 16, and "lower" refers to being closer to the turbine housing 4. Each vane 30 rotates on a post 32 that protrudes from the opposed side faces of the vane 30, with the post 32 defining a pivot axis 35. The free ends of the post 32 are received in respective apertures in the upper vane ring 40 and the lower vane ring 42. The angular orientation of the upper vane ring 40 relative to the lower vane ring 42 is set such that the corresponding apertures in the vane rings 40, 42 are concentric with the axis 35 of the posts 32, and the vane 30 is free to rotate about the axis 35. On the upper vane ring-side of the vane 30, the post 32 protrudes through corresponding aperture of the upper vane ring 40 and is affixed to a vane lever 36, which controls the rotational position of the vane 30 with respect to the vane rings 40, 42. An adjustment ring assembly 45 is arranged adjacent to, and in parallel with, the upper vane ring 40, and controls the position of all of the vane levers 36 in unison.

The adjustment ring assembly 45 includes the adjustment ring 50, small slide blocks 47 rotatably disposed on the turbine-facing side of the adjustment ring 50, and a large block 46 that is rotatably disposed on the compressor-facing side the adjustment ring 50 and is used to connect the adjustment ring 50 to an actuator. In use, the adjustment ring assembly 45 rotatably drives the vanes 30 via the vane levers 36, which link the adjustment ring assembly 45 to the individual vanes 30. In many configurations, forked arms 37 are formed on the ends of the vane levers 36 drive the independently rotatable slide blocks 47 to minimize friction in the system and to accommodate distortion and corrosion in the turbine housing, and thus the linkages. The adjustment ring 50 is allowed to rotate circumferentially with minimal friction, and is aligned radially so that it remains concentric with the upper and lower vane rings 40, 42, and axially so that the slide blocks 47 remain in contact with the vane levers 36.

The adjustment ring 50 is supported, and radially located, by curved ramparts 38 formed on the vane levers 36. The adjustment ring 50 is positioned axially between the vane levers 36 and a series of cap-screws 54 that are threaded into the bearing housing. The large block 46 is connected by a shaft to the adjustment ring 50. Circumferential motion of the large block 46 about the turbocharger rotational axis R causes the adjustment ring 50 to rotate about the turbocharger rotational axis R. Rotation of the adjustment ring 50 about the turbocharger rotational axis R causes the multiple small slide blocks 47 to rotate about the turbocharger rotational axis R while each of the slide blocks 47 also rotate about the rotational axis 35 of the vane posts 32. This motion of the slide blocks 47 causes the vane levers 36 to rotate about the rotational axis 35 of the vane posts 32 and change the angle of attack of the vanes 30 relative to the exhaust flow. The slide blocks 47 are designed so that the interface between each slide block 47 and the corresponding vane lever forked arms 37 is predominantly sliding friction over the entire area of one cheek of the rotating slide block 47.

The rotational orientation of the adjustment ring 50 is controlled by an actuator 110 (shown schematically in FIG. 1) which is operatively connected to the large block 46 via a linkage 48 and an actuation pivot shaft 52, whereby the adjustment ring 50 can rotated about the rotational axis R. The actuator receives commands from an engine electronic control unit (ECU, not shown).

Figure 4:
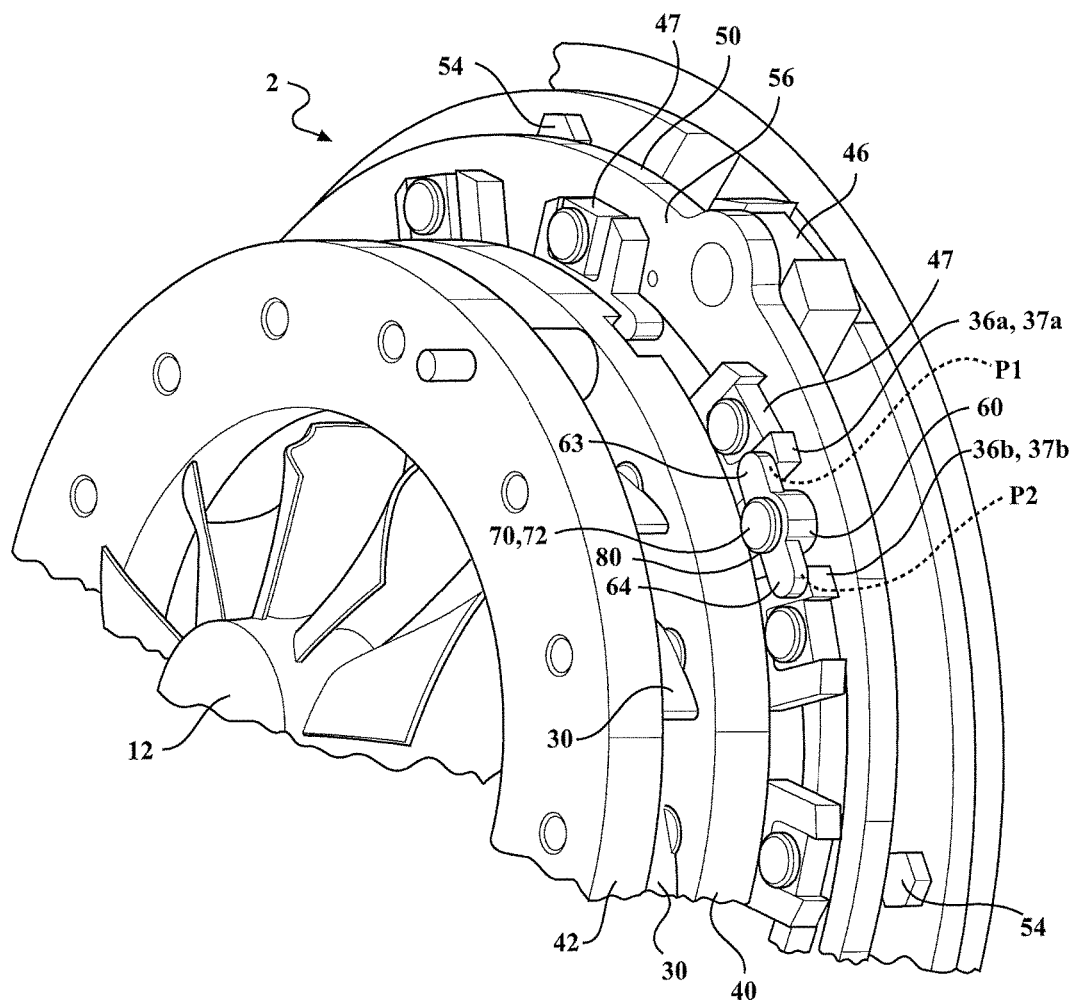
FIG. 4 is a perspective view of a portion of the turbine housing of the VTG turbocharger showing an adjustment ring assembly with a retention clip.
Figure 5:
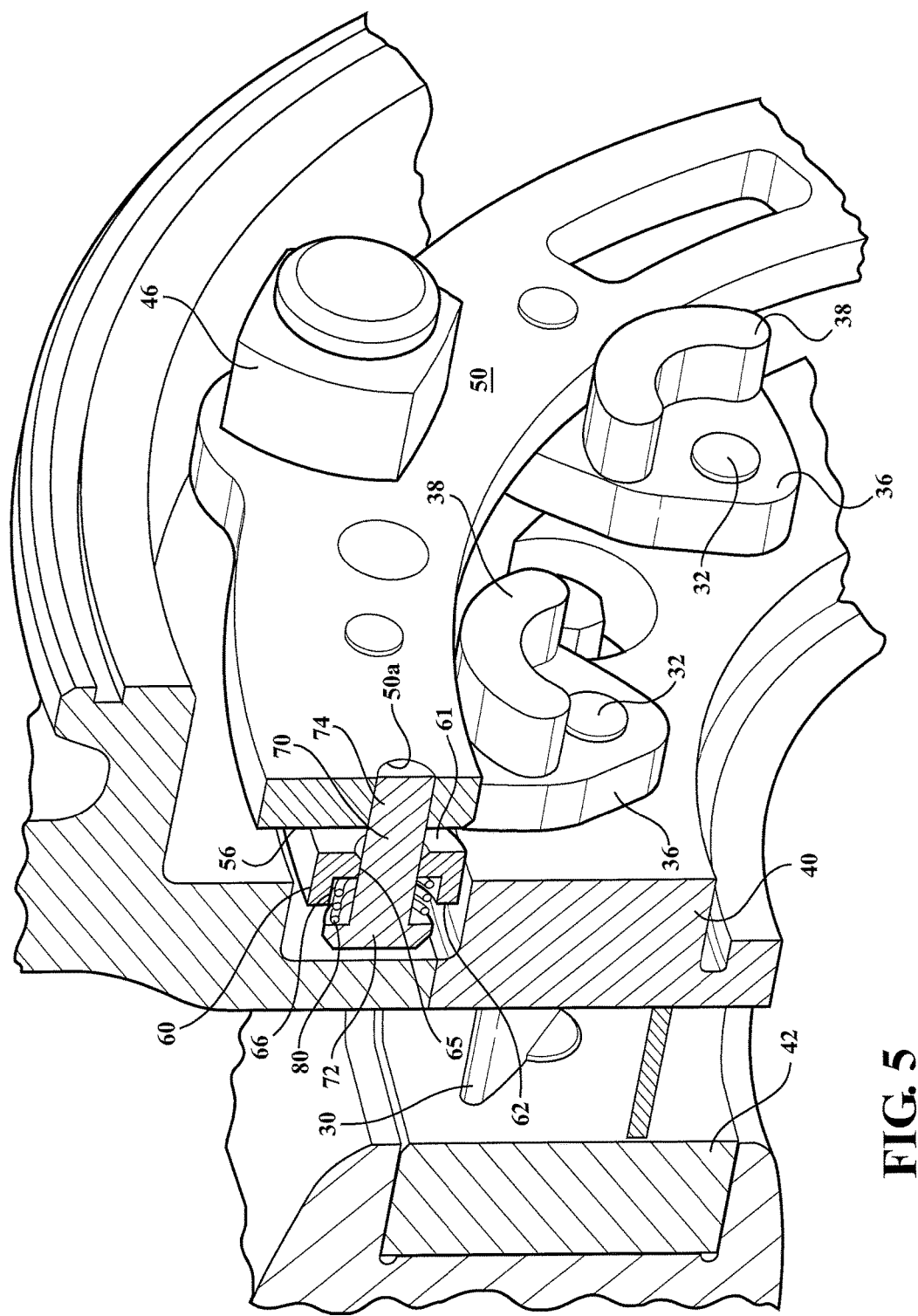
FIG. 5 is a cross sectional view through the adjustment ring and retention clip.

Referring to FIGS. 4 and 5, the VTG turbocharger 100 with guide vanes 30 includes a spring-loaded retention clip 60 that is rotatably secured to the upper vane ring 40 facing surface of the adjustment ring 50 via a pin 70 that is disposed mid-way between a pair of adjacent vane levers 36a, 36b. A mid-portion of the retention clip 60 includes a central opening 65 configured to receive the pin 70 and permit the retention clip 60 to pivot about the pin 70. In addition, an annular recess 66 is formed in the turbine wheel-facing surface 62 of the retention clip 60 which surrounds the central opening 65. A compression spring 80 is disposed in the recess 66.

The retention clip 60 has a circumferential dimension such that it overlies the near-side forked arms 37a, 37b of the pair of adjacent vane levers 36a, 36b. For example, the retention clip 60 is elongated circumferentially so as to include a first end 63 that overlies the near-side forked arm 37a of one of the vane levers 36a of the pair, and a second, opposed end 64 that overlies the near-side forked arm 37b of the other of the vane levers 36b of the pair. One of the ends (e.g., the first end 63) is keyed to the corresponding formed arm (e.g., forked arm 37a) such that the retention clip 60 rotates about the pin 70 in response to rotation of the vane levers 36.

The pin 70 includes a pin head 72 and a pin shank 74 that extends from the pin head 72. The pin shank 74 is fixed within a bore 50a formed in the adjustment ring 50, for example by welding. The bore 50a is located between the pair of adjacent vane levers 36a, 36b at a location corresponding to the instant center between corresponding points P1, P2 on the respective near forked arms 37a, 37b of the pair of adjacent vane levers 36a, 36b. The pin 70 is arranged so that the pin head 72 resides on the turbine-wheel facing side 56 of the adjustment ring 50 and is spaced apart therefrom. The pin shank 74 extends through the retention clip central opening 65, and the compression spring 80, which is coaxially disposed on the pin shank 74 within the retention clip recess 66, is retained within the recess 66 by the pin head 72. The compression spring 80 is under compression, and thus exerts a force on both the pin head 72 and the retention clip 60, whereby the retention clip 60 is biased away from the pin head 72 and toward the adjustment ring 50. Since the ends 63, 64 of the retention clip 60 overlie the respective near forked arms 37a, 37b of the pair of adjacent vane levers 36a, 36b, and since the retention clip 60 can move axially along the pin shank 74, the pair of adjacent vane levers 36a, 36b are also biased toward the adjustment ring 50. As a result, the retention clip 60 serves to pull the adjustment ring 50 into the facing surface of the vane levers 36.

In the illustrated embodiment, the adjustment ring 50 is provided with three retention clips 60 disposed equidistantly about the circumference of the adjustment ring 50. This arrangement reduces relative motion between the adjustment ring 50 and the vane levers 36, whereby noise and adjustment ring wear is reduced. In addition, this arrangement retains the adjustment ring 50 in its desired axial and radial orientation, reducing tilting and binding of the adjustment ring 50 during operation. Of course, a greater or fewer number of retention clips 60 can be employed depending on the requirements of a specific application, with a maximum number of retention clips 60 corresponding to the number of vane levers 36.

The pivotable connection of the retention clip 60 and each adjacent forked arm 37a, 37b allows the vane levers 36 to pivot to control the guide vanes 30. Relative motion between components is reduced by locating the pivot point of the retention clip 60 near the instant center between the points P1, P2 on adjacent vane levers 36 corresponding to locations of overlap of the retention clip ends 63, 64. The result is a small amount of rotational and translational movement between the retention clip 60 and the vane levers 36.

Although the retention clip 60 is illustrated herein as being elongated, it can have any peripheral shape that permits it to reside between the adjacent vane levers 36 and also overlie the near forked arms 37a, 36b of the adjacent vane levers 36a, 36b.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A variable turbine geometry turbocharger (100) comprising an adjustment ring assembly (45), the adjustment ring assembly (45) including
   an adjustment ring (50),
   a series of pivotable guide vanes (30) that are each operably connected to the adjustment ring (50) via a vane lever (36), and
   a retention clip (60) disposed between adjacent vane levers (36),
   wherein the retention clip (60) is pivotably secured to the adjustment ring (50) via a pin (70), and a helical spring is disposed on the pin (70) between the retention clip (60) and a head of the pin (70) and encompasses a pin shank (74) of the pin (70), whereby the retention clip (60) is biased by the spring toward the adjustment ring (50),
   wherein the retention clip (60) constantly contacts and applies a force against the vane levers (36) via the bias of the spring while also serving to help retain the adjustment ring (50) in its desired axial and radial orientation, reducing tilting and binding of the adjustment ring (50) during operation.

2. The turbocharger (100) of claim 1 wherein a pivot point of the retention clip (60) is near a center between points on adjacent vane levers (36).

3. The turbocharger (100) of claim 1, wherein the turbocharger includes three retention clips (60).

4. The turbocharger of (100) of claim 1, wherein the retention clip (60) overlies a turbine-wheel-facing side of the vane levers (36) and the applied force urges the vane-levers (36) toward the adjustment ring (50).

5. A variable turbine geometry turbocharger (100) comprising an adjustment ring assembly (45), the adjustment ring assembly (45) including
an adjustment ring (50),
a series of pivotable guide vanes (30) that are each operably connected to the adjustment ring (50) via a vane lever (36), and
a retention clip (60) disposed between adjacent vane levers (36),
wherein the retention clip (60) is attached to the adjustment ring (50) and applies a force against the vane levers (36) and includes a first end (63) which overlies a portion of one of the adjacent vane levers (36), and a second, opposed end (64) which overlies a portion of an other of the adjacent vane levers (36).

6. The turbocharger (100) of claim 5, wherein the first end (63) of the retention clip (60) is keyed to the one of the adjacent vane levers (36).

7. A variable turbine geometry turbocharger (100) comprising an adjustment ring assembly (45), the adjustment ring assembly (45) including
an adjustment ring (50),
a series of pivotable guide vanes (30) that are each operably connected to the adjustment ring (50) via a vane lever (36), each vane lever (36) having a vane lever (36) rampart that contact the adjustment ring (50),
a spring-biased retention clip (60) disposed between adjacent vane levers (36), the retention clip (60) being pivotable about a pivot point near a center between points on the adjacent vane levers (36),
wherein the retention clip (60) is attached to the adjustment ring (50) and constantly contacts and applies a force against the vane levers (36) as a result of spring-bias while also serving to help retain the adjustment ring (50) in its desired axial and radial orientation, reducing tilting and binding of the adjustment ring (50) during operation.

* * * * *